US011208127B2

(12) United States Patent
Jovenall (10) Patent No.: US 11,208,127 B2
(45) Date of Patent: Dec. 28, 2021

(54) SYSTEMS AND METHODS FOR CONTROLLING MOVEMENT DISTANCES OF LOCOMOTIVES

(71) Applicant: CATTRON NORTH AMERICA, INC., Warren, OH (US)

(72) Inventor: Jeremy Jovenall, Mercer, PA (US)

(73) Assignee: Cattron North America, Inc., Warren, OH (US)

( * ) Notice: Subject to any disclaimer, the term of this patent is extended or adjusted under 35 U.S.C. 154(b) by 415 days.

(21) Appl. No.: 16/274,442

(22) Filed: Feb. 13, 2019

(65) Prior Publication Data

US 2020/0256665 A1 Aug. 13, 2020

Related U.S. Application Data

(60) Provisional application No. 62/802,908, filed on Feb. 8, 2019.

(51) Int. Cl.
*B61L 3/12* (2006.01)
*G01B 9/02* (2006.01)
(Continued)

(52) U.S. Cl.
CPC ............... *B61L 3/127* (2013.01); *B61L 3/008* (2013.01); *B61L 25/026* (2013.01); *G01B 9/02* (2013.01);
(Continued)

(58) Field of Classification Search
CPC .......... B61L 3/008; B61L 3/127; B61L 17/00; B61L 25/026; G01B 9/02; G01B 11/026; G01B 11/105
See application file for complete search history.

(56) References Cited

U.S. PATENT DOCUMENTS

| 4,066,230 A | * | 1/1978 | Nohmi | .................... B60L 15/20 |
| | | | | 246/182 B |
| 4,384,695 A | * | 5/1983 | Nohmi | ..................... B61L 3/12 |
| | | | | 246/182 B |

(Continued)

FOREIGN PATENT DOCUMENTS

| JP | S6361167 A | 3/1988 |
| WO | WO-2018020928 A1 | 2/2018 |

OTHER PUBLICATIONS

European Office Action for EP application No. 19210597.1 that claims priority to the instant application; dated May 14, 2021; 6 pages.

(Continued)

*Primary Examiner* — Zachary L Kuhfuss
(74) *Attorney, Agent, or Firm* — Harness, Dickey & Pierce, P.L.C.; Anthony Fussner (57) ABSTRACT

An example automated locomotive spotting system includes a locomotive having a tractive effort mechanism for moving the locomotive along a track, and a locomotive controller configured to control the tractive effort mechanism to move the locomotive along the track. The locomotive controller includes an odometer configured to monitor a distance traversed by the locomotive along the track. The locomotive controller is configured to receive a requested spotting distance value, and initiate movement of the locomotive along the track via the tractive effort mechanism. The locomotive controller is also configured to monitor, by the odometer, the distance traversed by the locomotive along the track, and inhibit movement of the locomotive in response to the monitored odometer distance indicating the locomotive has traversed the requested spotting distance.

25 Claims, 5 Drawing Sheets

(51) Int. Cl.
   *G01B 11/02* (2006.01)
   *G01B 11/10* (2006.01)
   *B61L 3/00* (2006.01)
   *B61L 25/02* (2006.01)
   *B61L 17/00* (2006.01)

(52) U.S. Cl.
   CPC .......... *G01B 11/026* (2013.01); *G01B 11/105* (2013.01); *B61L 17/00* (2013.01)

(56) References Cited

U.S. PATENT DOCUMENTS

| | | | | |
|---|---|---|---|---|
| 4,852,007 | A * | 7/1989 | Yasunobu | B61L 3/008 |
| | | | | 701/70 |
| 5,758,848 | A * | 6/1998 | Beule | B60T 7/128 |
| | | | | 104/26.1 |
| 8,280,569 | B2 * | 10/2012 | Kumar | B61L 3/006 |
| | | | | 701/20 |
| 9,469,318 | B2 * | 10/2016 | Kanner | B61L 25/026 |
| 10,093,331 | B2 * | 10/2018 | Danielson | B61L 3/006 |
| 10,151,582 | B1 | 12/2018 | Jovenall | |
| 10,960,774 | B2 * | 3/2021 | Okahara | B60L 15/40 |
| 2004/0167687 | A1 * | 8/2004 | Kornick | B61L 17/00 |
| | | | | 701/19 |
| 2005/0010338 | A1 * | 1/2005 | Kraeling | B61L 25/026 |
| | | | | 701/19 |
| 2008/0195351 | A1 * | 8/2008 | Otsubo | B60L 15/10 |
| | | | | 702/149 |
| 2009/0312890 | A1 * | 12/2009 | Evans | B61L 17/00 |
| | | | | 701/2 |
| 2013/0138276 | A1 * | 5/2013 | Soderi | B61L 3/008 |
| | | | | 701/19 |

OTHER PUBLICATIONS

European Search Report for EP Application No. 19210597 which claims priority to the instant application; dated Jun. 5, 2020, 11 pages.

* cited by examiner

SYSTEMS AND METHODS FOR CONTROLLING MOVEMENT DISTANCES OF LOCOMOTIVES

CROSS-REFERENCE TO RELATED APPLICATION

This application claims priority to and the benefit of U.S. Provisional Patent Application No. 62/802,908 filed Feb. 8, 2019. The entire disclosure of the above application is incorporated herein by reference.

FIELD

The present disclosure generally relates to systems and methods for controlling movement distances of locomotives, such as spotting distances.

BACKGROUND

This section provides background information related to the present disclosure which is not necessarily prior art.

One way to classify locomotive systems (e.g., remote control locomotive (RCL) systems, etc.) is by operator tractive effort control mechanism. This categorization includes two major system types, which are speed control and throttle/brake control. Each system uses a different method for allowing the remote control operator to control the locomotive.

When using speed control, the operator selects a speed set point and the RCL system modulates tractive and braking efforts to maintain this speed. When using throttle/brake systems, the operator has direct control over the throttle and brake settings to control the speed of the locomotive.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Existing speed control and throttle/brake control locomotive systems do not allow an operator to directly select a specified distance for moving a locomotive. Some operations required very precise positioning of rolling stock, such as spotting railroad cars. When spotting railroad cars, the operator may be required to place the cars within feet, inches, etc. of a specified target point.

Speed control and throttle/brake control systems can be used for spotting railroad cars, but a certain skill level is needed to accomplish successful spotting. Further, spotting railroad cars or locomotives using speed control and throttle/brake control systems can be a very tedious process regardless of operator skillset.

Example embodiments described herein may ease the process of spotting railroad cars (e.g., by automating locomotive/car positioning, automating locomotive/car movement distance, etc.). Example embodiments may use the speed control systems, locomotive/brake systems, etc. to automate movement of the locomotives or railroad cars.

As one example use case, a remote control operator may have to position a hopper car under an output of a grain elevator. This type of move may require precision within one or two feet so the grain goes into a hatch at the top of the hopper car. Using manual speed control or throttle/brake control would require a combination of skill and luck to properly position the hopper car, while example automation embodiments described herein can simplify the process.

In some embodiments, a remote control operator may activate automated spotting by accessing a menu on an operator control unit (OCU). Within the menu, the operator may select a desired distance for the next movement of the locomotive. This specified distance may be entered into the OCU menu in feet, meters, etc. (which may be software configurable per user preference), and may have a limit on the maximum distance value that can be entered.

Once the specified distance for the next locomotive movement is entered and transmitted from the OCU to a locomotive controller (e.g., locomotive-mounted remote control locomotive (RCL) equipment, etc.), the locomotive-mounted RCL equipment may receive, validate and acknowledge the request.

After the OCU receives acknowledgement of the requested spotting distance from the locomotive controller, the operator may start or cancel the spotting movement. For example, an operator may stop the locomotive near the spotting area, then pace off a distance from the lead car to the desired target point. The operator could turn and face the car, enter the estimated movement distance, and initiate the movement in a spotting mode.

If the spotting movement is initiated, the locomotive controller will begin moving the locomotive in the commanded direction, and may utilize the most precise control method of tractive effort that is available if the locomotive includes multiple tractive effort mechanisms. For example, if the locomotive controller is configured to control movement of the locomotive via throttle and excitation control, then excitation control may be used for more precise movement control of the locomotive.

The odometer may be an internal variable of the locomotive controller, and the locomotive controller may move the locomotive until the specified locomotive movement distance is met on the odometer. Depending on a length of the specified locomotive movement distance, a maximum speed may be determined for moving the locomotive and a stopping trajectory may be calculated to stop precisely at the intended location (e.g., within a specified tolerance of 0.1%, 1%, 10%, etc.).

Movement of the locomotive may progress at very low speed until an odometer indicates that the requested locomotive movement distance requested has been traversed. The operator may abort the automated movement at any time. The locomotive movement may occur at a low speed because slack in couplers between railroad cars could run out if the movement is too fast and stops abruptly.

For example, each piece of rolling stock may include a coupler at each side. The couplers are connected to the car through a draft gear and are used to temporarily link rolling stock. The draft gear displaces force and slows a coupling to reduce damage to the car and its cargo.

Because these components need to move on the axis that has the force applied, the overall length of the car changes between 'stretched' and 'bunched' states. This distance can add up when many cars are connected in one train (e.g., freight train, passenger train, mine train, etc.). If a precise movement is made for a train including many cars, and the movement is in the shove direction (e.g., the locomotive pushing cars), then moving at too high of a speed and rapidly decelerating may let the slack out and the measurement of the odometer on the locomotive may differ significantly from what the odometer would otherwise measure if it were positioned on the leading car. This error would change the stopping/spotting trajectory, which would likely cause a movement overshoot that could damage equipment.

Additionally, the spotting movement could include making a joint (e.g., coupling) between two railroad cars, shoving toward a location having an object that should not be impacted by the leading car or the locomotive, etc., so a low movement speed may be used to inhibit damage to railroad cars or objects.

The odometer may be calibrated with suitable accuracy and precision to monitor movement of the locomotive. The accuracy and precision of the odometer may be used to define a minimum spotting distance, a maximum spotting distance, incremental values of spotting distance available in the OCU menu, etc. In some embodiments, the minimum spotting distance, the maximum spotting distance (e.g., less than or equal to about 25 feet), the incremental values, etc. may depend on a tolerance stack-up of the entire system.

Although an OCU use case is described above, other embodiments may not include an OCU, and spotting distances may be sent to the locomotive controller from a remote device. For example, the spotting distance may be transmitted by a server, central computing device, etc. that controls semi-autonomous RCL movements, remotely controls yard switches, etc.

As another example, a track signal switch or other sensor may alert the locomotive controller when the lead car passes a certain point where the locomotive should stop and enter spotting mode to travel a precise distance. The switch or sensor may send a dynamically updated spotting distance, such as when the lead car is pushed to a loading dock and needs precise movement feedback for the last few feet.

The system may include a range-finder device for specifying a target stop point. For example, the operator could point to a place (e.g., target point) where the locomotive or railroad car is supposed to stop at the end of the spotting movement, and the range-finder device could obtain a distance to the target point. The operator may confirm the specified spotting distance and forward that distance to the locomotive controller (e.g., through the OCU communication path, etc.). The range-finder device may be part of a peripheral device, such as a two-way radio handset, etc.

In some embodiments, the system may include a wheel size detector. Detection of an accurate wheel size of the locomotive can facilitate accurate system speedometer/odometer readings to make precise distance-critical movements for required spotting precision. By way of example, some exemplary embodiments may include system or method for monitoring locomotive wheel size as disclosed in U.S. Pat. No. 10,151,582, which is incorporated herein by reference in its entirety.

For example, using the midrange wheel size of a standard North American locomotive wheel as a starting point, one full wheel rotation may result in around one foot of linear distance difference in each direction at the maximum and minimum acceptable wheel sizes. The speedometer/odometer may determine a distance traveled by counting fractions of rotations of the wheel. The wheel size may be used to calculate wheel perimeter and extrapolate distance travelled based on rotations of the axle generator.

In one example embodiment, an automated locomotive spotting system includes a locomotive having a tractive effort mechanism for moving the locomotive along a track. The system also includes a locomotive controller configured to control the tractive effort mechanism to move the locomotive along the track.

The locomotive controller includes an odometer configured to monitor a distance traversed by the locomotive along the track, and the locomotive controller is configured to receive a requested spotting distance value and initiate movement of the locomotive along the track via the tractive effort mechanism.

The locomotive controller is also configured to monitor, by the odometer, the distance traversed by the locomotive along the track, and to inhibit movement of the locomotive in response to the monitored odometer distance indicating the locomotive has traversed the requested spotting distance.

The system may include an operator control unit (OCU), and the locomotive controller may be a remote control locomotive (RCL) controller. The OCU can include a user interface for receiving input from an operator, and a wireless interface in communication with the RCL controller. The OCU is configured to receive the requested spotting distance value via the user interface, and the RCL controller is configured to receive the requested spotting distance value from the OCU.

For example, an operator control unit may be equipped with one or more wireless interfaces, such as a short-range wireless communication interface, a Wi-Fi wireless communication interface, etc. Each wireless interface may include an antenna, a wireless radio, etc. for communicating with a locomotive controller.

The operator control unit may include an enclosure (e.g., a housing) including a user interface, a display, etc. The operator control unit may include a processor, battery, memory, a global navigation satellite system (GNSS) antenna (e.g., a GPS antenna, etc.), one or more accelerometers (e.g., an accelerometer array, a single accelerometer, etc.) for tilt detection, etc.

The RCL controller is configured to validate the requested spotting distance value in response to receiving the requested spotting distance value from the OCU and send an acknowledgement to the OCU, and the OCU is configured to initiate spotting distance movement or cancel spotting distance movement in response to receiving the acknowledgement from the RCL controller.

The OCU may be configured to transmit an abort signal to the RCL controller to cancel the spotting distance movement while the RCL controller is controlling spotting distance movement of the locomotive in response to receiving an abort input from the user interface of the OCU.

In some embodiments, the OCU is configured to limit the requested spotting distance value between a maximum spotting distance and a minimum spotting distance, the OCU is configured to allow the operator to select a specified number of incremental values for the requested spotting distance value, and the maximum spotting distance, the minimum spotting distance and the specified number of incremental values are determined according to an accuracy of the odometer. The maximum spotting distance may be defined as a product of the accuracy and precision of the odometer and tolerance stack-up of the entire system. By way of example, the maximum spotting distance may be less than or equal to 25, etc.

In some embodiments, the system includes comprising a range-finding device configured to determine a distance to a target stop point of the locomotive in response to pointing the range-finding device at the target stop point. The OCU is configured to receive the determined distance to the target stop point from the range-finding device, and determine the requested spotting distance value according to the determined distance to the target stop point.

The system may include a remote control device in wireless communication with the locomotive controller, where the remote control device is configured to transmit the requested spotting distance value to the locomotive controller. For example, the remote control device may be part of a remote system for controlling one or more yard switches and semi-autonomous movements of the locomotive, and the remote system may be configured to transmit the requested spotting distance value to the locomotive controller to automate yard switching by moving the locomotive across at least a portion of a railyard to a switch.

Alternatively, or additionally, the remote control device may be a track signal switch or sensor, where the locomotive controller is configured to receive the requested spotting distance value in response to the locomotive crossing the track signal switch or sensor, and the requested spotting distance value includes a specified distance corresponding to a location of the track signal switch or sensor.

In some embodiments, the locomotive controller is configured to receive an updated spotting distance value while controlling movement of the locomotive along the track via the tractive effort mechanism, and update the requested spotting distance value according to the received updated spotting distance value to provide dynamic spotting distance control. The locomotive controller may be configured to initiate movement of the locomotive via excitation control when the tractive effort mechanism includes throttle control and excitation control.

The locomotive controller may be configured to maintain a movement speed of the locomotive below or equal to a specified speed threshold while controlling spotting distance movement of the locomotive. For example, the system may include one or more cars coupled to the locomotive. The cars may include couplers and draft gears. The specified speed threshold may be less than a speed at which stopping the locomotive lets out coupling slack between the cars or less than a speed at which establishing a joint coupling between two cars damages one or more of the cars.

In some embodiments, the locomotive controller is configured to store multiple movement models corresponding to different spotting distances to traverse, with each movement model including different tractive effort and/or braking control parameters. The locomotive controller may be configured to select one of the movement models corresponding to the received requested spotting distance value to control spotting distance movement of the locomotive.

The system may include a wheel size detector configured to determine a size of the wheel, where the odometer is configured to monitor the distance traversed by the locomotive along the track according to the determined size of the wheel and a number of rotations and/or fractions of rotations of the wheel.

Figure 1:
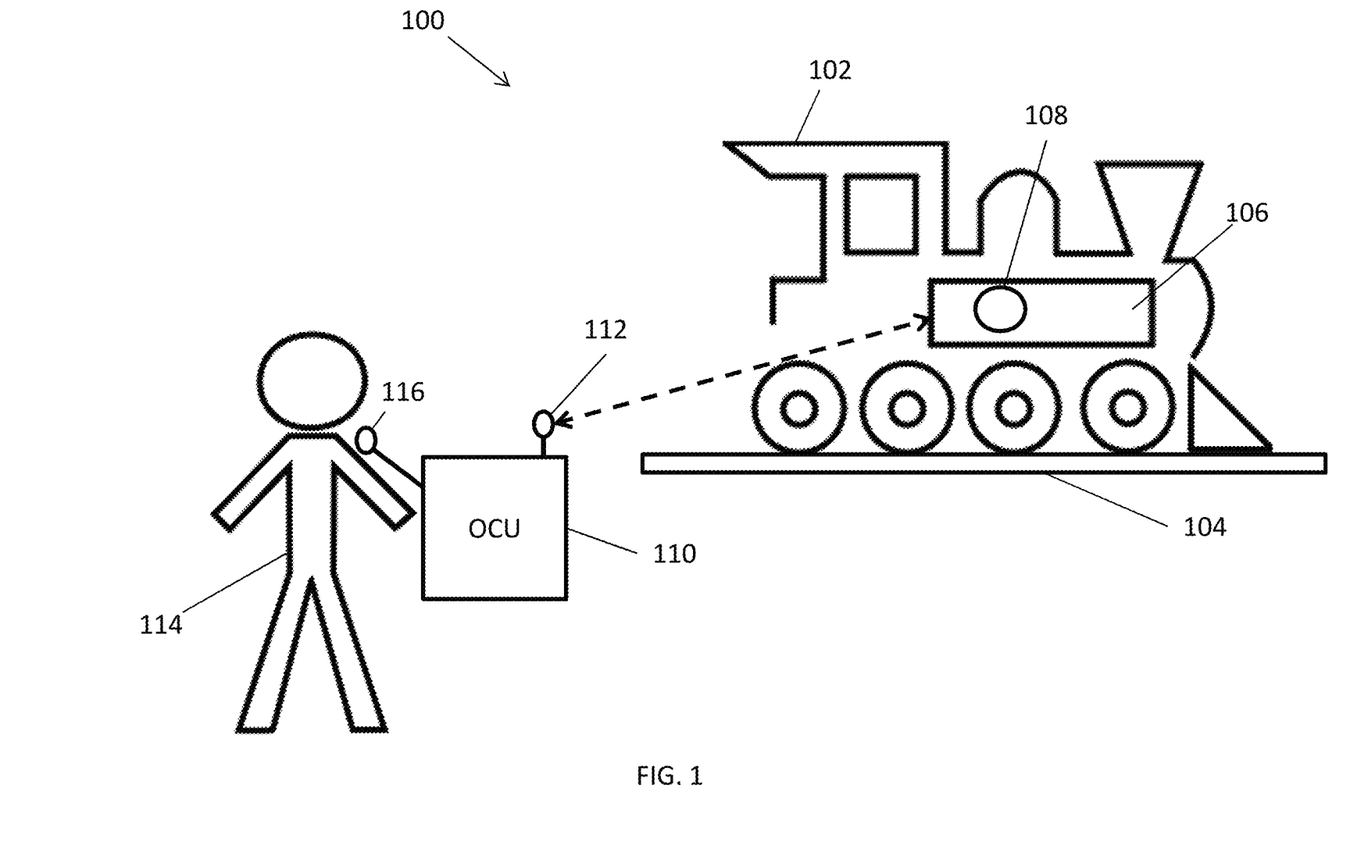
FIG. 1 is a diagram of an automated locomotive spotting system according to one example embodiment of the present disclosure.

With reference to the figures, FIG. 1 illustrates an automated locomotive spotting system 100 according to some aspects of the present disclosure. The system 100 includes a locomotive 102 having a tractive effort mechanism for moving the locomotive 102 along a track 104. The system 100 also includes a locomotive controller 106 configured to control the tractive effort mechanism to move the locomotive 102 along the track 104.

The locomotive controller 106 includes an odometer 108 configured to monitor a distance traversed by the locomotive 102 along the track 104. The locomotive controller 106 is configured to receive a requested spotting distance value and initiate movement of the locomotive 102 along the track 104 via the tractive effort mechanism.

The locomotive controller 106 is also configured to monitor, by the odometer 108, the distance traversed by the locomotive 102 along the track 104, and to inhibit movement of the locomotive 102 in response to the monitored odometer distance indicating the locomotive 102 has traversed the requested spotting distance.

The system 100 also includes an optional operator control unit 110 in wireless communication with the locomotive controller 106. The operator control unit 110 includes a wireless interface 112 configured to transmit one or more commands to the locomotive controller 106. For example, the operator control unit 110 may receive commands from an operator 114, and transmit the commands to the locomotive controller 106 to control movement of the locomotive 102.

Figure 2:
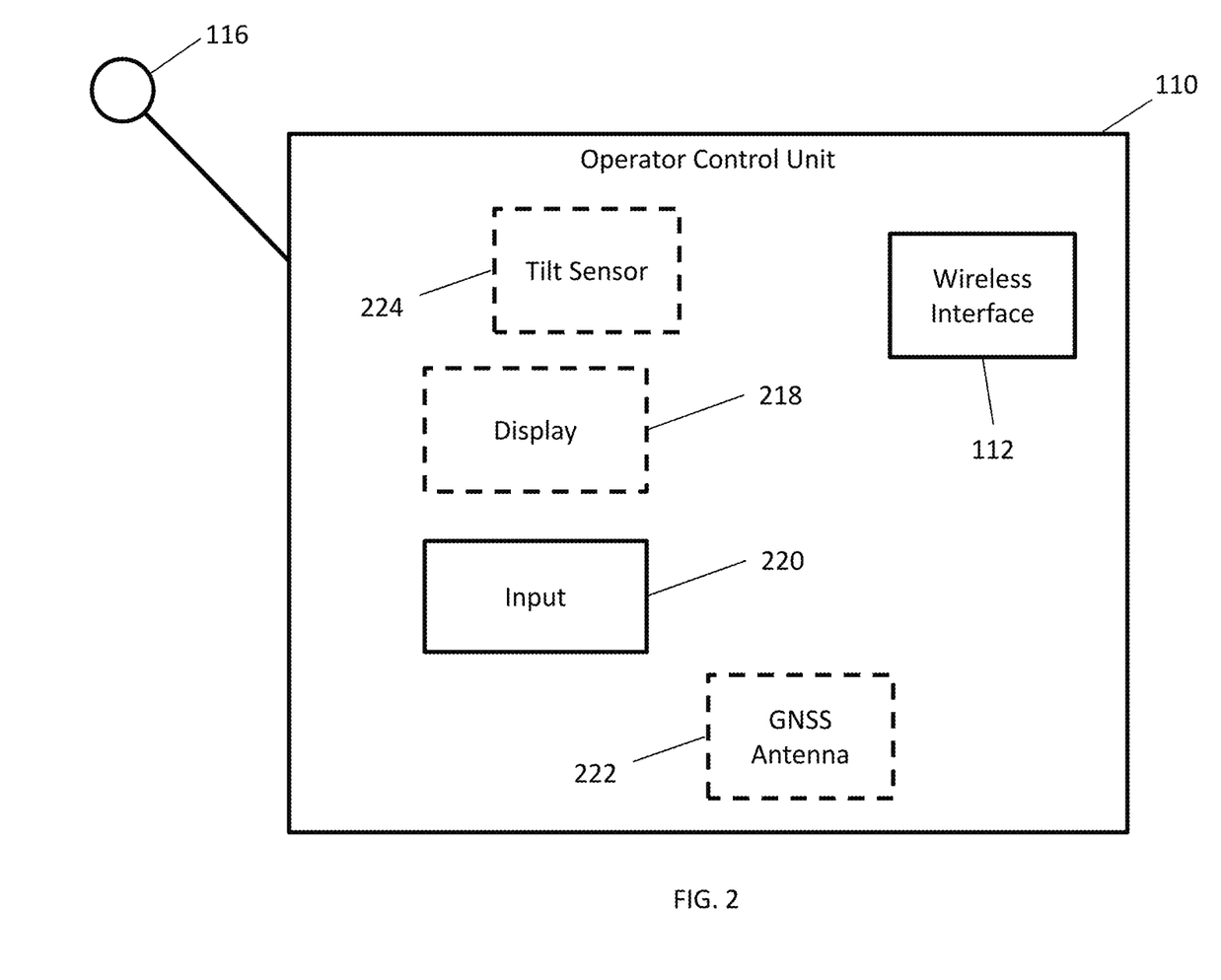
FIG. 2 is a block diagram of an operator control unit for communication with the locomotive controller of FIG. 1.

FIG. 2 illustrates a block diagram of the operator control unit 110 shown in FIG. 1. The operator control unit 110 includes an optional display 218 and an input 220. The optional di splay 218 can be any suitable di splay (e.g., a liquid crystal di splay (LCD), light emitting diodes (LED), indicator lights, etc.). The input 220 can include any suitable input element(s) (e.g., a keypad, touchscreen, switches, etc.), for receiving inputs (e.g., commands, etc.) from the operator 114.

The operator control unit 110 may be connected with a range-finding device 116. The range-finding device 116 may be a peripheral device, may be attached to or incorporated in the operator control unit 110, etc. The range-finding device 116 is configured to determine a distance to a target stop point of the locomotive 102 in response to pointing the range-finding device 116 at the target stop point.

The OCU 110 may be configured to receive the determined distance to the target stop point from the range-finding device 116, and determine the requested spotting distance value according to the determined distance to the target stop point. For example, the operator control unit 110 includes a wireless interface 112 which may communicate with the locomotive controller 106 via an RF channel, etc.

The operator control unit 110 may include an optional global navigation satellite system (GNSS) antenna 222 for determining a location of the operator control unit 110. For example, the GNSS antenna 222 may be a global positioning system (GPS) antenna. The operator control unit 110 can include a tilt sensor 224.

Figure 3:
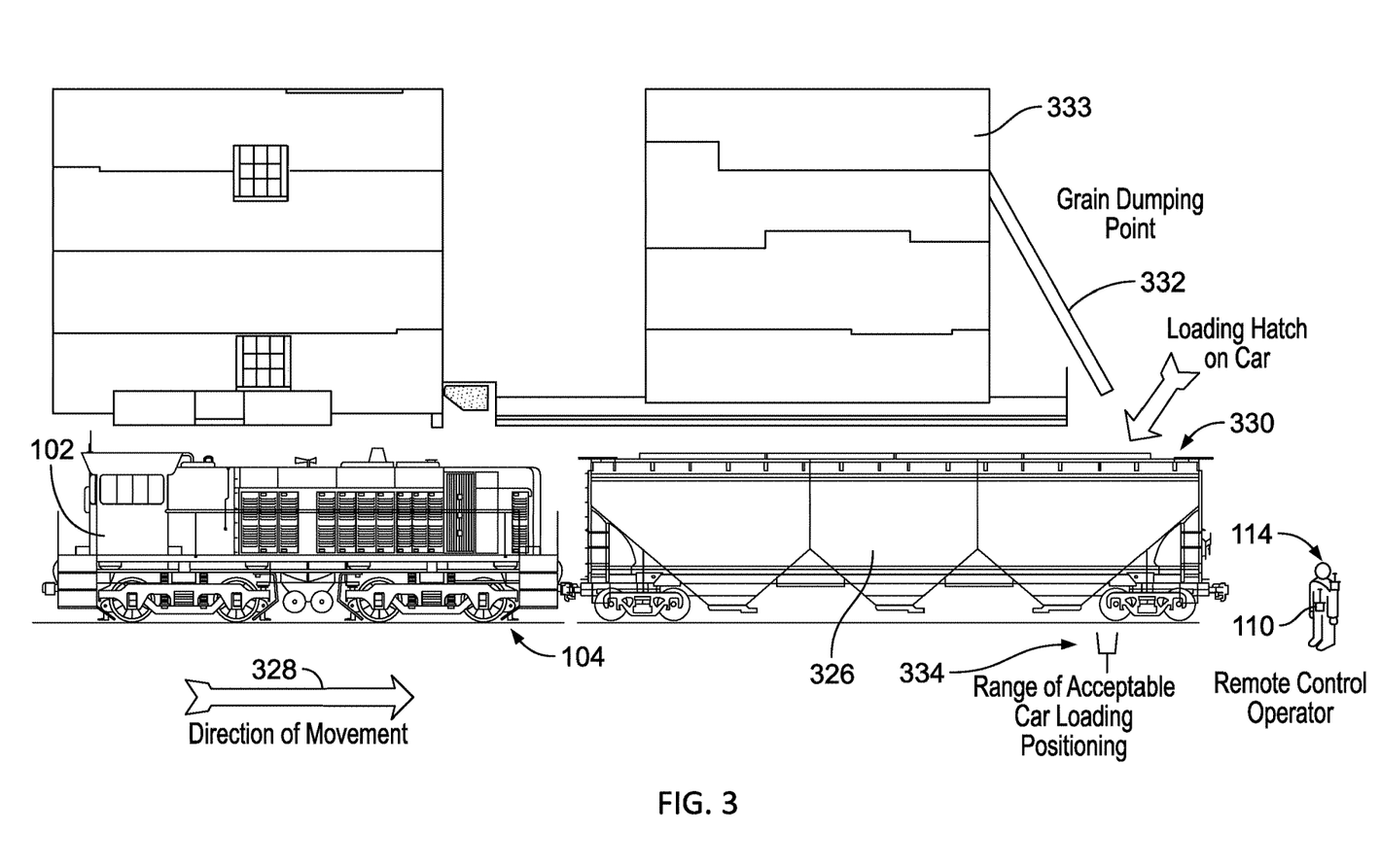
FIG. 3 is a diagram of an example use case for the automated locomotive spotting system of FIG. 1.

FIG. 3 illustrates an example use case for the system 100 of FIG. 1. As shown in FIG. 3, an operator 114 is controlling movement of a locomotive 102 along a track 104, via an OCU 110. The locomotive 102 is pushing a hopper car 326 along the track 104 in a direction 328.

The operator 114 controls movement of the locomotive 102 to align a loading hatch 330 of the hopper car 326 with a grain dumping point 332 of a grain feeder 333. The operator must spot the hopper car 326 within the spotting range 334 in order for grain to enter the loading hatch 330.

Using only speed control and throttle/brake control to control movement of the locomotive 102 would require a combination of skill and luck for the operator 114 to properly align the hopper car 326 within the spotting range 334. However, the example automated system 100 makes it easier for the operator 114 to align the hopper car 326 within the spotting range 334 because the operator 114 can stop the locomotive 102, enter a specified distance for the locomotive to move to place the hopper car 326 within the spotting range 334, and the locomotive controller 106 can automate movement of the locomotive 102.

Figure 4:
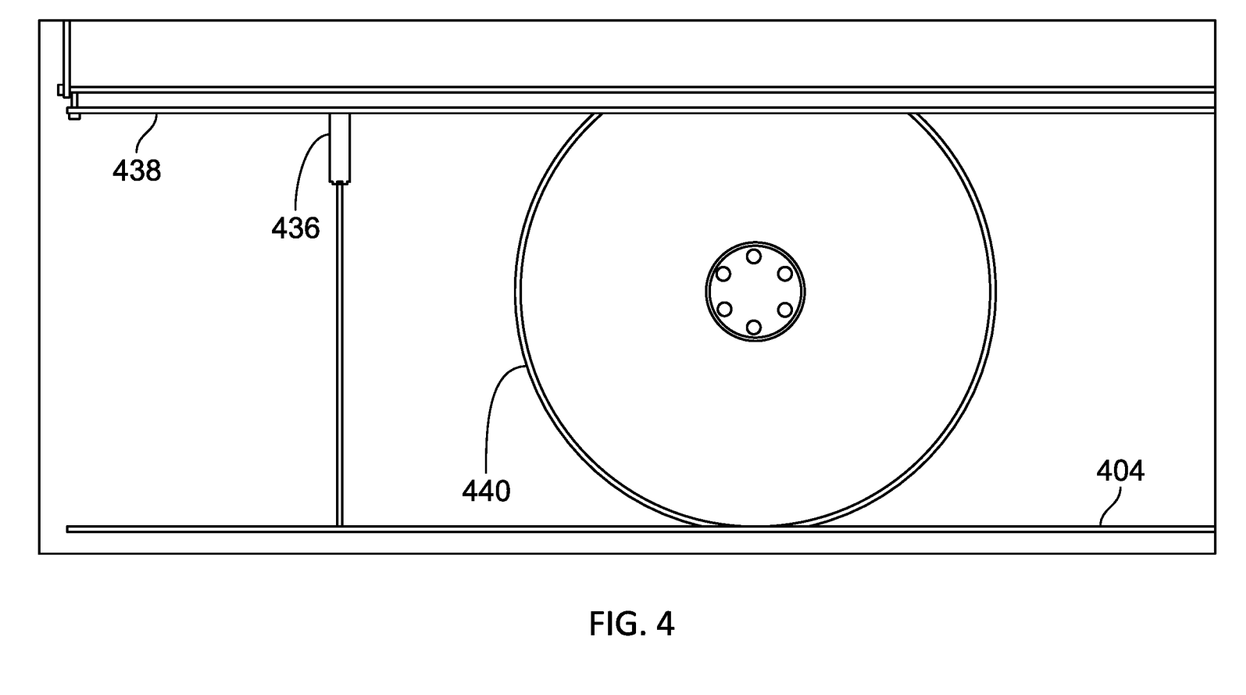
FIG. 4 is a diagram of a wheel size detector according to another example embodiment of the present disclosure.

FIG. 4 shows a wheel detector for monitoring locomotive wheel size according to another exemplary embodiment. As shown, a laser interferometer 436 (broadly, distance measurement device) is coupled (e.g., mounted via brackets, bezels, and mechanical fasteners, etc.) to a frame 438 of the locomotive 102 above the rail 404 on which are positioned the right or starboard side wheels 440 of the locomotive 102.

In this exemplary embodiment, the laser interferometer 436 may be positioned directly above the rail 404 and oriented such that the laser from the laser interferometer 436 strikes the rail 404. In operation, the laser interferometer 436 measures the distance to the rail 404, which may correspond to a height of the interferometer 436 above the rail 404. The measurements may then be used to determine the diameter of the locomotive wheel 440, e.g., after a one-time calibration.

During operation of the locomotive 102, the diameters of the locomotive wheels 440 decrease (e.g., each at about the same rate, etc.) due to wear and tear on the locomotive wheels 440. As the wheel diameter decreases, the heights of the locomotive frame 438 and laser interferometers 436 above the rail 404 will decrease by the same amount that the wheel diameter decreased. Accordingly, analyzing the measurements from the laser interferometer 436 may reveal that the frame and device heights above the rail (or distance to the rail) have decreased.

For example, the distance measurement from the laser interferometer 436 may be compared to an initial device height measurement (e.g., manually measured with a tape measure, etc.) to determine the extent of any change in height. Or, for example, the laser interferometer 436 may be configured (e.g., preprogrammed and activated, etc.) to measure the heights or distances to the rail at predetermined and/or regular intervals, which measurements may be recorded and compared to determine the extent of any change in height.

The change in height of the laser interferometer 436 would correspond with or equal the reduction in height of the locomotive frame 438 above the rail, which, in turn, corresponds with or equals the reduction in wheel diameter. The decrease in wheel diameter may be subtracted from the previously determined or known wheel diameter (e.g., 42 inches for a new wheel in North America, etc.) to obtain the updated decreased wheel diameter. Accordingly, the measurements obtained by the laser interferometer 436 may thus be used to indirectly determine the wheel diameter reduction, which, in turn, may be used to determine the up-to-date decreased wheel diameter.

The updated wheel diameter may be used by the locomotive controller and/or odometer to precisely monitor a movement distance of the locomotive along the track. For example, if an accurate wheel circumference is known based on a measured wheel diameter, an accurate movement distance can be determined for the locomotive based on an accurate number of wheel rotations.

Figure 5:
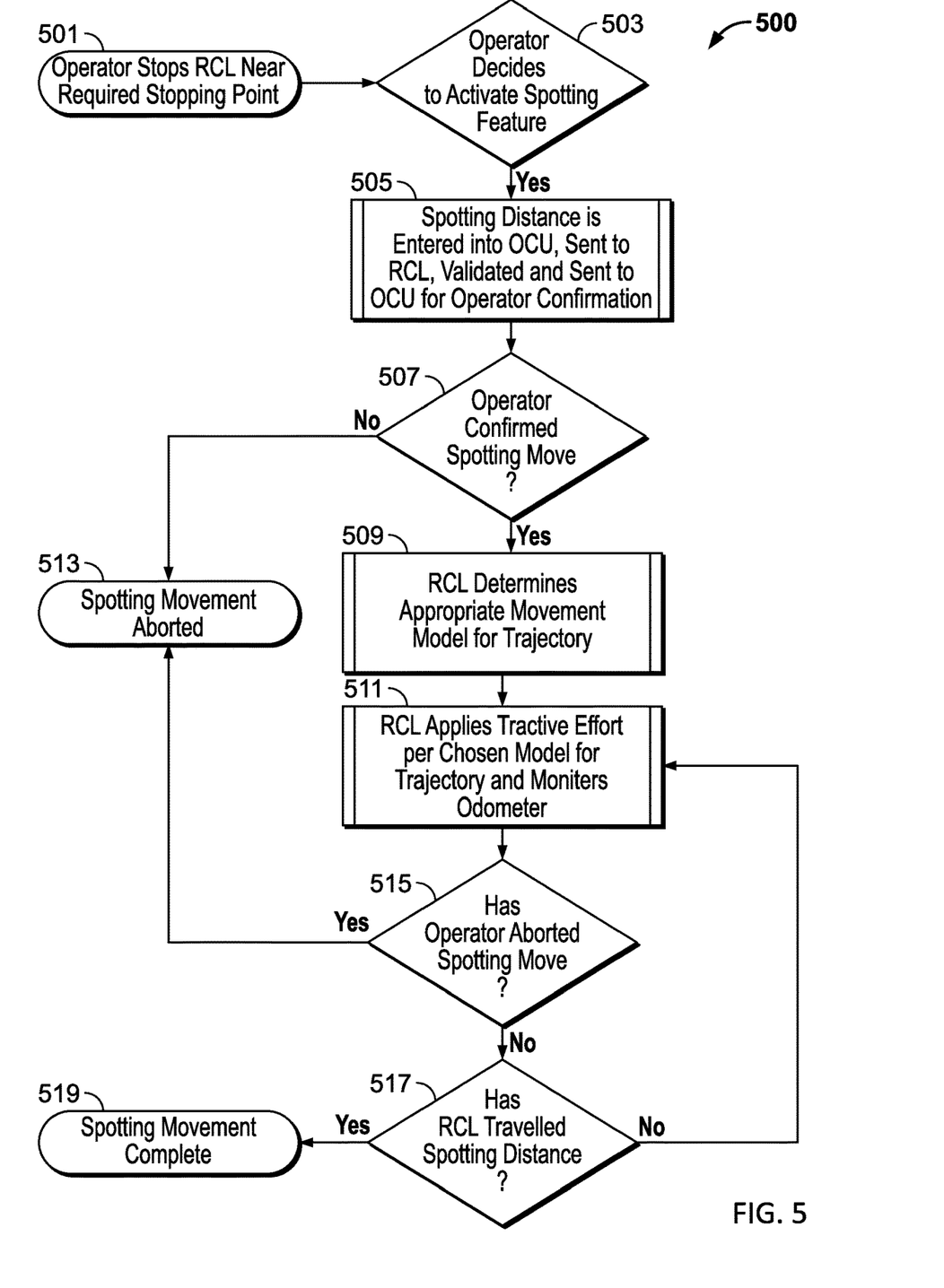
FIG. 5 is a flow chart illustrating an example method for controlling movement distance of a locomotive according to another example embodiment of the present disclosure.

As example method 500 for controlling movement of a locomotive is illustrated in FIG. 5 according to another example embodiment of the present disclosure. As shown in FIG. 5, an operator may stop a locomotive near a required stopping point at 501, and activate a spotting movement feature at 503.

At 505, the spotting distance is entered into the OCU, sent to the locomotive controller, and transmitted back to the OCU after validation for operator confirmation. If the operator does not confirm the spotting move at 507, the spotting movement is aborted at 513. If the operator confirms the spotting move at 507, the RCL determines an appropriate movement model for the starting and stopping trajectory of the locomotive at 509. The locomotive controller then applies tractive effort according to the selected model and monitors the odometer, at 511.

If the operator aborts the spotting move at 515, the spotting movement is aborted at 513. If not, the locomotive controller checks whether the locomotive has traveled the requested spotting distance at 517. If not, the locomotive controller continues to apply tractive effort according to the selected model at 511. If the locomotive determines the locomotive has travelled the selected spotting distance at 517, the spotting movement is complete at 519.

As described herein, the example operator control units and locomotive controllers may include a microprocessor, microcontroller, integrated circuit, digital signal processor, etc., which may include memory. The operator control units and locomotive controllers may be configured to perform (e.g., operable to perform, etc.) any of the example processes described herein using any suitable hardware and/or software implementation. For example, the operator control units and locomotive controllers may execute computer-executable instructions stored in a memory, may include one or more logic gates, control circuitry, etc.

According to another example embodiment, a locomotive controller includes an odometer configured to monitor a distance traversed by a locomotive along a track, a memory configured to store computer-executable instructions, and a processor. The processor is configured to execute the computer-executable instructions stored in memory to receive a requested spotting distance value from an operator control unit or other remote device. The processor is further configured to control a tractive effort mechanism of the locomotive to move the locomotive along the track in response to receiving the requested spotting distance value.

The processor is further configured to monitor, by the odometer, the distance traversed by the locomotive along the track, and inhibit movement of the locomotive in response to the monitored odometer distance indicating the locomotive has traversed the requested spotting distance.

According to another example embodiment, there is disclosed an exemplary method of controlling movement of a locomotive (broadly, a rail vehicle or railcar, such as powered rail vehicle, rail transport vehicle, etc.). The locomotive includes a tractive effort mechanism for moving the locomotive along a track. The exemplary method generally includes receiving, by a locomotive controller, a requested locomotive movement distance value, and controlling the tractive effort mechanism to move the locomotive along the track in response to receiving the requested locomotive movement distance value.

The method also includes monitoring, by an odometer, a distance traversed by the locomotive along the track, and inhibiting movement of the locomotive in response to the monitored odometer distance indicating the locomotive has traversed the requested locomotive movement distance.

In some embodiments, the locomotive controller is a remote control locomotive (RCL) controller, and an operator control unit (OCU) includes a user interface for receiving input from an operator, and a wireless interface in communication with the RCL controller. The method includes receiving the requested locomotive movement distance value includes receiving, by the OCU, the requested locomotive movement distance value via the user interface, and transmitting the requested locomotive movement distance value from the OCU to the RCL.

The method may include transmitting an abort signal from the OCU to the RCL controller to cancel the locomotive distance movement while the RCL controller is controlling locomotive distance movement of the locomotive, in response to receiving an abort input from the user interface of the OCU.

In some embodiments, the method includes limiting, by the OCU, the requested locomotive movement distance value between a maximum locomotive movement distance and a minimum locomotive movement distance, and allowing, by the OCU, the operator to select a specified number of incremental values for the requested locomotive movement distance value. The maximum locomotive movement distance, the minimum locomotive movement distance and the specified number of incremental values are determined according to an accuracy of the odometer.

The method may include determining, by a range-finding device, a distance to a target stop point of the locomotive in response to pointing the range-finding device at the target stop point, and receiving, by the OCU, the determined distance to the target stop point from the range-finding device, and determining the requested locomotive movement distance value according to the determined distance to the target stop point.

In some embodiments, a remote control device is in wireless communication with the locomotive controller. The remote control device includes a remote system for controlling one or more yard switches and semi-autonomous movements of the locomotive, and the method includes transmitting the requested locomotive movement distance value to the locomotive controller to automate yard switching by moving the locomotive across at least a portion of a railyard to a switch.

Alternatively, or additionally, the remote control device includes a track signal switch or sensor, and the method includes receiving, by the locomotive controller, the requested spotting distance value in response to the locomotive crossing the track signal switch or sensor. The requested locomotive distance value includes a specified distance corresponding to a location of the track signal switch or sensor.

The method may include receiving, by the locomotive controller, an updated locomotive movement distance value while controlling movement of the locomotive along the track via the tractive effort mechanism, and updating the requested locomotive movement distance value according to the received updated locomotive movement distance value to provide dynamic locomotive movement distance control.

The method may include maintaining, by the locomotive controller, a movement speed of the locomotive below or equal to a specified speed threshold while controlling locomotive distance movement of the locomotive. The specified speed threshold is less than a speed at which stopping the locomotive lets out coupling slack between cars coupled to the locomotive, or less than a speed at which establishing a joint coupling between two cars damages one of the cars.

In some embodiments, the method includes storing, in a memory of the locomotive controller, multiple movement models corresponding to different locomotive distances to traverse. Each movement model includes different tractive effort and/or braking control parameters. The method further includes selecting one of the movement models corresponding to the received requested locomotive distance value to control distance movement of the locomotive.

The system may include a wheel size detector, where the method includes a determining a size of the wheel, and monitoring the distance traversed by the locomotive includes monitoring the distance traversed by the locomotive along the track according to the determined size of the wheel and a number of rotations and/or fractions of rotations of the wheel.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purposes of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An automated locomotive spotting system for a locomotive including a tractive effort mechanism for moving the locomotive along a track, the system comprising:

an operator control unit (OCU);
a locomotive controller configured to control the tractive effort mechanism to automate movement of the locomotive along the track, the locomotive controller including an odometer configured to monitor a distance traversed by the locomotive along the track, the locomotive controller configured to:
  receive a requested spotting distance value;
  initiate movement of the locomotive along the track via the tractive effort mechanism;
  monitor, by the odometer, the distance traversed by the locomotive along the track; and
  inhibit movement of the locomotive in response to the monitored odometer distance indicating the locomotive has traversed the requested spotting distance;
wherein:
  the locomotive controller comprises a remote control locomotive (RCL) controller;
  the OCU includes a user interface for receiving input from an operator, and a wireless interface in communication with the RCL controller;
  the OCU is configured to receive the requested spotting distance value via the user interface; and
  the RCL controller is configured receive the requested spotting distance value from the OCU;
and wherein the system further comprises:
  (A) a remote control device in wireless communication with the locomotive controller, and wherein the remote control device is configured to transmit the requested spotting distance value to the locomotive controller, the remote control device comprises a track signal switch or sensor, the locomotive controller is configured to receive the requested spotting distance value in response to the locomotive crossing the track signal switch or sensor, and the requested spotting distance value includes a specified distance corresponding to a location of the track signal switch or sensor; and/or
  (B) a distance measurement device coupled to the locomotive and configured to measure a distance to a rail when a locomotive wheel is positioned on the rail, the system configured to use the distance to the rail as measured by the distance measurement device to determine an updated diameter of the locomotive wheel that is usable to monitor the distance traversed by the locomotive along the track.

2. The system of claim 1, wherein:
the RCL controller is configured to validate the requested spotting distance value in response to receiving the requested spotting distance value from the OCU and send an acknowledgement to the OCU; and
the OCU is configured to initiate spotting distance movement or cancel spotting distance movement in response to receiving the acknowledgement from the RCL controller.

3. The system of claim 1, wherein the OCU is configured to transmit an abort signal to the RCL controller to cancel the spotting distance movement while the RCL controller is controlling spotting distance movement of the locomotive in response to receiving an abort input from the user interface of the OCU.

4. The system of claim 1, wherein:
the OCU is configured to limit the requested spotting distance value between a maximum spotting distance and a minimum spotting distance;

the OCU is configured to allow the operator to select a specified number of incremental values for the requested spotting distance value; and the maximum spotting distance, the minimum spotting distance, and the specified number of incremental values are determined according to an accuracy of the odometer.

5. The system of claim 4, wherein the maximum spotting distance is defined as a product of the accuracy and precision of the odometer multiplied by a tolerance stack-up of components, including the odometer, of the entire automated locomotive spotting system.

6. The system of claim 4, wherein the maximum spotting distance is less than or equal to 25 feet.

7. The system of claim 1, further comprising a range-finding device, wherein:
the range-finding device is configured to determine a distance to a target stop point of the locomotive in response to an operator pointing the range-finding device at the target stop point; and
the OCU is configured to receive the determined distance to the target stop point from the range-finding device, and determine the requested spotting distance value according to the determined distance to the target stop point.

8. The system of claim 1, wherein the locomotive controller is configured to initiate movement of the locomotive via excitation control when the tractive effort mechanism includes throttle control and excitation control.

9. The system of claim 1, wherein the locomotive controller is configured to maintain a movement speed of the locomotive below or equal to a specified speed threshold while controlling spotting distance movement of the locomotive.

10. The system of claim 9, wherein the specified speed threshold is less than a speed at which stopping the locomotive lets out coupling slack between cars coupled to the locomotive or less than a speed at which establishing a joint coupling between two cars damages one of the cars.

11. The system of claim 1, wherein the odometer is configured to monitor the distance traversed by the locomotive along the track according to the updated diameter of the locomotive wheel and a number of rotations and/or fractions of rotations of the locomotive wheel.

12. An automated locomotive spotting system for a locomotive including a tractive effort mechanism for moving the locomotive along a track, the system comprising:
a locomotive controller configured to control the tractive effort mechanism to automate movement of the locomotive along the track, the locomotive controller including an odometer configured to monitor a distance traversed by the locomotive along the track, the locomotive controller configured to:
receive a requested spotting distance value;
initiate movement of the locomotive along the track via the tractive effort mechanism;
monitor, by the odometer, the distance traversed by the locomotive along the track; and
inhibit movement of the locomotive in response to the monitored odometer distance indicating the locomotive has traversed the requested spotting distance; and
a laser interferometer mounted to a frame of the locomotive at a location such that the laser interferometer is directly above a rail on which a locomotive wheel is positioned and operable for producing a laser to strike the rail, whereby the laser interferometer is configured to measure a distance to the rail that corresponds to a height of the laser interferometer above the rail, and wherein the system is configured to use the distance measured by the laser interferometer to determine an updated diameter of the locomotive wheel that is usable to monitor the distance traversed by the locomotive along the track.

13. An automated locomotive spotting system for a locomotive including a tractive effort mechanism for moving the locomotive along a track, the system comprising:
a locomotive controller configured to control the tractive effort mechanism to automate movement of the locomotive along the track, the locomotive controller including an odometer configured to monitor a distance traversed by the locomotive along the track, the locomotive controller configured to:
receive a requested spotting distance value;
initiate movement of the locomotive along the track via the tractive effort mechanism;
monitor, by the odometer, the distance traversed by the locomotive along the track; and
inhibit movement of the locomotive in response to the monitored odometer distance indicating the locomotive has traversed the requested spotting distance;
wherein the system further comprises a remote control device in wireless communication with the locomotive controller, and wherein the remote control device is configured to transmit the requested spotting distance value to the locomotive controller, the remote control device comprises a track signal switch or sensor, the locomotive controller is configured to receive the requested spotting distance value in response to the locomotive crossing the track signal switch or sensor, and the requested spotting distance value includes a specified distance corresponding to a location of the track signal switch or sensor; and
wherein the remote control device further comprises a remote system for controlling one or more yard switches and semi-autonomous movements of the locomotive, and the remote system is configured to transmit the requested spotting distance value to the locomotive controller to automate yard switching by moving the locomotive across at least a portion of a railyard to a switch.

14. An automated locomotive spotting system for a locomotive including a tractive effort mechanism for moving the locomotive along a track, the system comprising:
a locomotive controller configured to control the tractive effort mechanism to automate movement of the locomotive along the track, the locomotive controller including an odometer configured to monitor a distance traversed by the locomotive along the track, the locomotive controller configured to:
receive a requested spotting distance value;
initiate movement of the locomotive along the track via the tractive effort mechanism;
monitor, by the odometer, the distance traversed by the locomotive along the track; and
inhibit movement of the locomotive in response to the monitored odometer distance indicating the locomotive has traversed the requested spotting distance; and
wherein the system further comprises a distance measurement device configured to be coupled to the locomotive and configured to measure a distance to a rail when a locomotive wheel is positioned on the rail; and
wherein the system is configured to:
use the distance to the rail as measured by the distance measurement device to determine a decrease in the distance to the rail that corresponds to a decrease in the diameter of the locomotive wheel; and
use the decrease in the distance to the rail to determine an updated diameter of the locomotive wheel that is usable to monitor the distance traversed by the locomotive along the track.

15. An automated locomotive spotting system for a locomotive including a tractive effort mechanism for moving the locomotive along a track, the system comprising:
a locomotive controller configured to control the tractive effort mechanism to automate movement of the locomotive along the track, the locomotive controller including an odometer configured to monitor a distance traversed by the locomotive along the track, the locomotive controller configured to:
receive a requested spotting distance value;
initiate movement of the locomotive along the track via the tractive effort mechanism;
monitor, by the odometer, the distance traversed by the locomotive along the track; and
inhibit movement of the locomotive in response to the monitored odometer distance indicating the locomotive has traversed the requested spotting distance;
wherein the locomotive controller is configured to receive an updated spotting distance value while controlling movement of the locomotive along the track via the tractive effort mechanism, and update the requested spotting distance value according to the received updated spotting distance value to provide dynamic spotting distance control;
and wherein the system further comprises:
(A) a remote control device in wireless communication with the locomotive controller, and wherein the remote control device is configured to transmit the requested spotting distance value to the locomotive controller, the remote control device comprises a track signal switch or sensor, the locomotive controller is configured to receive the requested spotting distance value in response to the locomotive crossing the track signal switch or sensor, and the requested spotting distance value includes a specified distance corresponding to a location of the track signal switch or sensor; and/or
(B) a distance measurement device coupled to the locomotive and configured to measure a distance to a rail when a locomotive wheel is positioned on the rail, the system configured to use the distance to the rail as measured by the distance measurement device to determine an updated diameter of the locomotive wheel that is usable to monitor the distance traversed by the locomotive along the track.

16. An automated locomotive spotting system for a locomotive including a tractive effort mechanism for moving the locomotive along a track, the system comprising:
a locomotive controller configured to control the tractive effort mechanism to automate movement of the locomotive along the track, the locomotive controller including an odometer configured to monitor a distance traversed by the locomotive along the track, the locomotive controller configured to:
receive a requested spotting distance value;
initiate movement of the locomotive along the track via the tractive effort mechanism;
monitor, by the odometer, the distance traversed by the locomotive along the track; and
inhibit movement of the locomotive in response to the monitored odometer distance indicating the locomotive has traversed the requested spotting distance;
wherein:
the locomotive controller is configured to store multiple movement models corresponding to different spotting distances to traverse;
each movement model includes different tractive effort and/or braking control parameters; and
the locomotive controller is configured to select a one of the movement models corresponding to the received requested spotting distance value to control spotting distance movement of the locomotive;
and wherein the system further comprises:
(A) a remote control device in wireless communication with the locomotive controller, and wherein the remote control device is configured to transmit the requested spotting distance value to the locomotive controller, the remote control device comprises a track signal switch or sensor, the locomotive controller is configured to receive the requested spotting distance value in response to the locomotive crossing the track signal switch or sensor, and the requested spotting distance value includes a specified distance corresponding to a location of the track signal switch or sensor; and/or
(B) a distance measurement device coupled to the locomotive and configured to measure a distance to a rail when a locomotive wheel is positioned on the rail, the system configured to use the distance to the rail as measured by the distance measurement device to determine an updated diameter of the locomotive wheel that is usable to monitor the distance traversed by the locomotive along the track.

17. A method of controlling movement of a locomotive, the locomotive including a tractive effort mechanism for moving the locomotive along a track, the method comprising:
receiving, by a locomotive controller, a requested locomotive movement distance value;
controlling the tractive effort mechanism to automate movement of the locomotive along the track in response to receiving the requested locomotive movement distance value;
monitoring, by an odometer, a distance traversed by the locomotive along the track; and
inhibiting movement of the locomotive in response to the monitored odometer distance indicating the locomotive has traversed the requested locomotive movement distance;
wherein:
the locomotive controller comprises a remote control locomotive (RCL) controller; and
receiving the requested locomotive movement distance value includes receiving the requested locomotive movement distance value via a user interface of an operator control unit (OCU), and transmitting the requested locomotive movement distance value from the OCU to the RCL controller;
and wherein:
(A) receiving, by the locomotive controller, the requested locomotive movement distance value includes receiving, by the locomotive controller, the requested locomotive movement distance from a remote control device in wireless communication with the locomotive controller in response to the locomotive crossing a track signal switch or sensor of the remote control device, the requested locomotive movement distance includes a specified distance corresponding to a location of the track signal switch or sensor; and/or (B) monitoring, by the odometer, the distance traversed by the locomotive along the track includes using an updated diameter of a locomotive wheel that is determined by using a distance to a rail as measured by a distance measurement device coupled to the locomotive when the locomotive wheel is positioned on the rail.

18. The method of claim 17, further comprising transmitting an abort signal from the OCU to the RCL controller to cancel the locomotive distance movement while the RCL controller is controlling locomotive distance movement of the locomotive in response to receiving an abort input from the user interface of the OCU.

19. The method of claim 17, further comprising:
limiting, by the OCU, the requested locomotive movement distance value between a maximum locomotive movement distance and a minimum locomotive movement distance; and
allowing, by the OCU, the operator to select a specified number of incremental values for the requested locomotive movement distance value;
wherein the maximum locomotive movement distance, the minimum locomotive movement distance, and the specified number of incremental values are determined according to an accuracy of the odometer.

20. The method of claim 17, comprising:
determining, by a range-finding device, a distance to a target stop point of the locomotive in response to pointing the range-finding device at the target stop point; and
receiving, by the OCU, the determined distance to the target stop point from the range-finding device, and determining the requested locomotive movement distance value according to the determined distance to the target stop point.

21. The method of claim 17, further comprising maintaining, by the locomotive controller, a movement speed of the locomotive below or equal to a specified speed threshold while controlling locomotive distance movement of the locomotive, wherein the specified speed threshold is less than a speed at which stopping the locomotive lets out coupling slack between cars coupled to the locomotive, or less than a speed at which establishing a joint coupling between two cars damages one of the cars.

22. The method of claim 17, wherein:
the method includes using the distance to the rail as measured by the distance measurement device to determine a decrease in the distance to the rail that corresponds to a decrease in the diameter of the locomotive wheel, and using the decrease in the distance to the rail to determine the updated diameter of the wheel, and
monitoring the distance traversed by the locomotive includes monitoring the distance traversed by the locomotive along the track according to the updated diameter of the locomotive wheel and a number of rotations and/or fractions of rotations of the locomotive wheel.

23. A method of controlling movement of a locomotive, the locomotive including a tractive effort mechanism for moving the locomotive along a track, the method comprising:
receiving, by a locomotive controller, a requested locomotive movement distance value;
controlling the tractive effort mechanism to automate movement of the locomotive along the track in response to receiving the requested locomotive movement distance value;
monitoring, by an odometer, a distance traversed by the locomotive along the track;
inhibiting movement of the locomotive in response to the monitored odometer distance indicating the locomotive has traversed the requested locomotive movement distance; and
transmitting the requested locomotive movement distance value to the locomotive controller to automate yard switching by moving the locomotive across at least a portion of a railyard to a switch;
and wherein:
(A) receiving, by the locomotive controller, the requested locomotive movement distance value includes receiving, by the locomotive controller, the requested locomotive movement distance from a remote control device in wireless communication with the locomotive controller in response to the locomotive crossing a track signal switch or sensor of the remote control device, the requested locomotive movement distance includes a specified distance corresponding to a location of the track signal switch or sensor; and/or
(B) monitoring, by the odometer, the distance traversed by the locomotive along the track includes using an updated diameter of a locomotive wheel that is determined by using a distance to a rail as measured by a distance measurement device coupled to the locomotive when the locomotive wheel is positioned on the rail.

24. A method of controlling movement of a locomotive, the locomotive including a tractive effort mechanism for moving the locomotive along a track, the method comprising:
receiving, by a locomotive controller, a requested locomotive movement distance value;
controlling the tractive effort mechanism to automate movement of the locomotive along the track in response to receiving the requested locomotive movement distance value;
monitoring, by an odometer, a distance traversed by the locomotive along the track;
inhibiting movement of the locomotive in response to the monitored odometer distance indicating the locomotive has traversed the requested locomotive movement distance;
receiving, by the locomotive controller, an updated locomotive movement distance value while controlling movement of the locomotive along the track via the tractive effort mechanism; and
updating the requested locomotive movement distance value according to the received updated locomotive movement distance value to provide dynamic locomotive movement distance control;
and wherein:
(A) receiving, by the locomotive controller, the requested locomotive movement distance value includes receiving, by the locomotive controller, the requested locomotive movement distance from a remote control device in wireless communication with the locomotive controller in response to the locomotive crossing a track signal switch or sensor of the remote control device, the requested locomotive movement distance includes a specified distance corresponding to a location of the track signal switch or sensor; and/or (B) monitoring, by the odometer, the distance traversed by the locomotive along the track includes using an updated diameter of a locomotive wheel that is determined by using a distance to a rail as measured by a distance measurement device coupled to the locomotive when the locomotive wheel is positioned on the rail.

25. A method of controlling movement of a locomotive, the locomotive including a tractive effort mechanism for moving the locomotive along a track, the method comprising:

receiving, by a locomotive controller, a requested locomotive movement distance value;

controlling the tractive effort mechanism to automate movement of the locomotive along the track in response to receiving the requested locomotive movement distance value;

monitoring, by an odometer, a distance traversed by the locomotive along the track;

inhibiting movement of the locomotive in response to the monitored odometer distance indicating the locomotive has traversed the requested locomotive movement distance;

storing, in a memory of the locomotive controller, multiple movement models corresponding to different locomotive distances to traverse, each movement model including different tractive effort and/or braking control parameters; and selecting one of the movement models corresponding to the received requested locomotive distance value to control distance movement of the locomotive;

and wherein:

(A) receiving, by the locomotive controller, the requested locomotive movement distance value includes receiving, by the locomotive controller, the requested locomotive movement distance from a remote control device in wireless communication with the locomotive controller in response to the locomotive crossing a track signal switch or sensor of the remote control device, the requested locomotive movement distance includes a specified distance corresponding to a location of the track signal switch or sensor; and/or (B) monitoring, by the odometer, the distance traversed by the locomotive along the track includes using an updated diameter of a locomotive wheel that is determined by using a distance to a rail as measured by a distance measurement device coupled to the locomotive when the locomotive wheel is positioned on the rail.

\* \* \* \* \*